No. 773,906. PATENTED NOV. 1, 1904.
A. G. WATERHOUSE.
STEAM AND VACUUM PUMP.
APPLICATION FILED DEC. 4, 1903.
NO MODEL.

Witnesses
C. W. Benjamin
M. Hollingshead

Inventor
A. G. Waterhouse,
By his Attorney
T. F. Bourne

No. 773,906. Patented November 1, 1904.

UNITED STATES PATENT OFFICE.

ADDISON G. WATERHOUSE, OF ROCKLAND COUNTY, NEW YORK, ASSIGNOR TO WATERHOUSE STEAM AND VACUUM PUMP COMPANY, A CORPORATION OF MAINE.

STEAM AND VACUUM PUMP.

SPECIFICATION forming part of Letters Patent No. 773,906, dated November 1, 1904.

Application filed December 4, 1903. Serial No. 183,690. (No model.)

*To all whom it may concern:*

Be it known that I, ADDISON G. WATERHOUSE, a citizen of the United States, residing in Rockland county, State of New York, have invented certain new and useful Improvements in Steam and Vacuum Pumps, of which the following is a specification.

This invention has reference to improvements in the class of pumping apparatus commonly called "steam and vacuum" pumps, wherein liquid is pumped from a receptacle by the pressure of steam therein and the receptacle is recharged by means of a vacuum formed therein. In such pumps to obtain the best results it is necessary to admit a limited volume of air into the receptacle to rest upon the liquid therein in the form of a stratum or layer to keep the steam from immediate contact with the liquid and then when the liquid in the receptacle about reaches a predetermined low level to suddenly discharge the air from between the liquid and the steam in order to permit the steam to descend upon the liquid to start condensation of the steam, whereupon liquid for further condensation of the steam enters the receptacle.

The object of my invention is to cause a volume of air to enter the receptacle with the liquid, to discharge such air suddenly from between the liquid and the steam, and to utilize such discharged air for causing the operation of the valve that controls the supply of steam to the receptacle; and to this end my invention embraces certain novel means for controlling the operation of said valve in connection with the discharged air from the receptacle and also the novel details of improvement, that will be more fully hereinafter set forth and then pointed out in the claims.

Reference is to be had to the accompanying drawings, forming part hereof, wherein—

Figure 1:
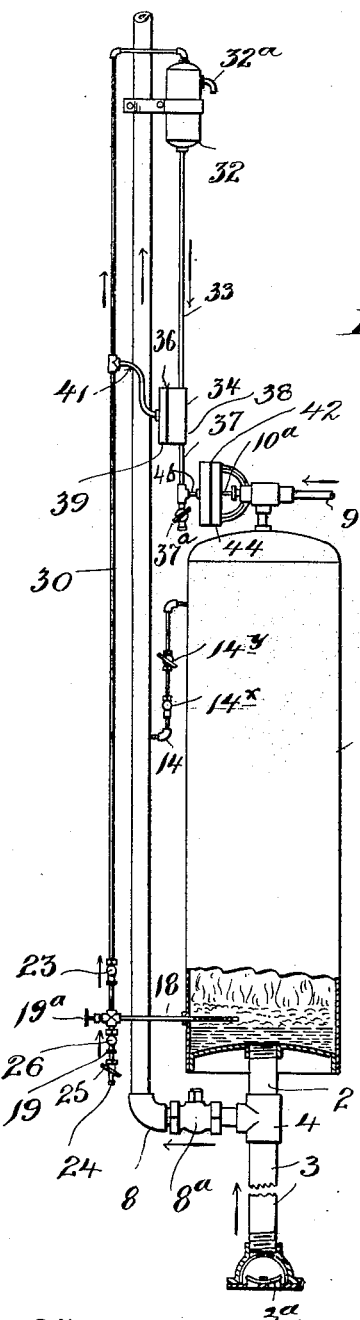
Figure 2:
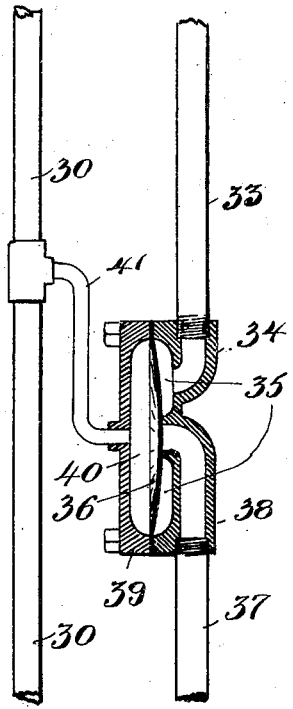
Figure 3:
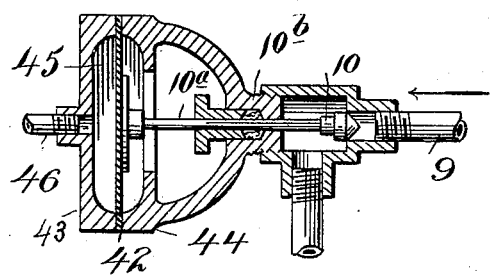

Figure 1 is a side elevation, partly in section, of an apparatus embodying my invention. Fig. 2 is a sectional detail view, enlarged, through the cramper or steam-controller; and Fig. 3 is an enlarged section through the valve-operating device.

In the drawings the numeral 1 indicates a liquid-receptacle provided with means for admitting steam thereto and with liquid induction and eduction means. In the example illustrated a pipe 2 leads into the lower part of the receptacle and communicates with a supply-pipe 3, shown provided with a foot-valve $3^a$, and said pipes are shown connected with a T or coupling 4, which communicates with a discharge-pipe 8, provided with a check-valve $8^a$ to prevent return-flow of liquid from pipe 8.

At 9 is indicated a steam-supply pipe communicating with the upper portion of receptacle 1 and provided with a valve 10, whose stem $10^a$ is shown passing through a stuffing-box $10^b$. The pipe for admitting liquid for condensing the steam in receptacle 1 is indicated at 14 as connected with discharge-pipe 8 and provided with a check-valve $14^x$ to prevent return-flow from 1 to 8 and a cock $14^y$ to regulate the passage through pipe 14. The foregoing parts may generally be of any well-known construction adapted for the purpose herein set forth and illustrate a form of mechanism with which my improvements may operate.

The means I have shown for admitting air to the receptacle to form an insulating layer or stratum upon the surface of liquid therein and for discharging the air from the receptacle at the required time are as follows: At or near the predetermined low level for the liquid in the receptacle the latter is provided with an air opening or passage, which is shown in the form of a perforated or screen-like pipe 18 extending into the receptacle and communicating with an air-inlet, indicated at 19 in the form of a pipe which has an air-inlet opening, as at 24, and is provided with a cock 25 to regulate or restrict the passage and with a check-valve 26 to permit the admission and prevent the discharge of air through pipe 19. The pipe 18 also communicates with a pipe 30, provided with a check-valve 23 to prevent return-flow from 30 to 18, and at $19^a$ is indicated a cock or screw to regulate the flow through pipe 30 of liquid and air from receptacle 1, whereby the speed of such flow can be restricted as required.

The mechanical arrangements shown for controlling the steam-valve 10 operate through the medium of the fluid and air passing from outlet 18 through pipe 30 as follows: The pipe 30 leads into a liquid box or tank 32, which for convenience I term a "time-box" and which is provided with an overflow or spout at $32^a$ to regulate the height of liquid therein. From the time-box 32 a pipe 33 extends to a regulating device, which I term a "cramper," (indicated generally at 34,) which comprises a casing having a chamber 35, to which the pipe 33 leads, a flexible diaphragm 36, forming one wall of said chamber, and a pipe 37 also communicates with said chamber. In the construction shown I provide two shells 38, 39, between which the diaphragm 36 is clamped, thereby forming closed chambers 35 and 40 on opposite sides of the diaphragm. The end of pipe or passage 37 that opens into chamber 35 is in position to be closed by diaphragm 36 when the latter is bulged toward the same to thereby stop the flow of liquid from box 32 through chamber 35 into pipe 37 and to permit such flow when the pressure on the opposite side of the diaphragm in chamber 40 is relieved. The pipe 37 has a restricting outlet or cock $37^a$ to regulate the flow of liquid from said pipe. The chamber 40 is connected by a pipe 41 with pipe 30.

Fig. 2 shows an enlarged section of the cramper 34 with pipes, ports, and passages, as described. The flexible diaphragm 36, which forms a partition between the chambers 35 and 40, is shown bulged toward chamber 35 in a way to close the central opening leading to pipe 37, so that the passage through chamber 35 from pipe 33 to pipe 37 is closed, and this will remain closed so long as the liquid stands in pipe 30 as high as the liquid stands in pipe 33, for the reason that the weight of liquid in pipe 30 is transmitted through pipe 41 to the chamber 40 and this weight bears upon the whole surface of the diaphragm 36 and forces it to the position shown, while the weight due to a like column of liquid in pipe 33 exerts an opposing pressure in chamber 35 upon only a part of the surface of the diaphragm 36 on account of the central opening leading to pipe 37, covering a part of the diaphragm-surface against which the pressure due to liquid in chamber 35 does not operate. Therefore the pressure due to like columns of liquid in both of the pipes 30 and 33 will cause the passage through chamber 35 from pipe 33 to pipe 37 to remain closed until the air blows out the liquid from pipe 30 and removes the pressure from chamber 40. The weight of the liquid in pipe 33 acting against the diaphragm 36 will then bulge it in the opposite direction and leave a free passage from pipe 33 to pipe 37. I utilize the liquid flowing through pipe 37 to control the flow of steam past valve 10 into receptacle 1, and the flow through pipe 37 is primarily controlled by the air discharged from the receptacle.

To this end stem $10^a$ of valve 10 is shown bearing against a diaphragm 42, that is clamped against the hollow face of a shell 43 by a frame or disk 44, providing a recess or chamber 45 on the side of the diaphragm opposite the stem $10^a$. This chamber or recess 45 is connected with pipe 37 above the restricting-cock $37^a$ by a pipe 46, whereby the liquid from pipe 37 may enter said chamber 45 and bulge the diaphragm 42, which then pushes stem $10^a$, and thereby closes valve 10 to shut off the steam from receptacle 1. When the liquid drains from pipe 37, the pressure of steam upon valve 10, or a spring connected with said valve for the purpose, opens the valve to permit steam from supply-pipe 9 to enter receptacle 1. In this form of apparatus when the receptacle 1 is charged with liquid and its complement of air, which lies upon the surface of the liquid as an insulating stratum, and time-box 32 and pipes 33 37 are empty of liquid the steam-valve 10 will open, and the steam entering receptacle 1 will force the liquid therefrom through pipe 8, and some of the liquid will flow through outlet 18 and up pipe 30 into time-box 32 and through pipe 41 into chamber 40, and during such flow the weight of liquid in pipe 30 will impart a pressure through pipe 41 and into chamber 40, which will bulge diaphragm 36 and close the central opening leading from chamber 35 into pipe 37, and thus prevent the valve 10 from being closed by liquid from pipe 37. When the liquid in receptacle 1 has descended to a level approximating or below the outlet 18, the air that is between the liquid and the steam will suddenly pass through outlet 18 and up pipe 30, pushing the liquid in said pipe before it into box 32, and said air will then rush out through the overflow $32^a$. The pressure in chamber 40 will thus be relieved of the pressure due to the weight of liquid in pipe 30, and thereupon the weight of liquid in pipe 33 will be sufficient to push the diaphragm 36 away from the central opening communicating with pipe 37, and liquid will then flow from 33 through chamber 35 into pipe 37 and thence through pipe 46 into chamber 45 and will bulge diaphragm 42 and close the steam-valve 10 to shut off the supply of steam to the receptacle. As soon as the air passes from between the steam and liquid in receptacle 1, as stated, the steam therein will descend upon the liquid to start condensation of such steam, and while the steam is shut off the back pressure of liquid from pipe 8 will cause the liquid to pass through pipe 14 into receptacle 1 to complete the condensation of steam and create a partial vacuum therein, whereupon a renewed charge of liquid and its complement of air through inlets 2 and 18 will be admitted to the receptacle. While the receptacle 1 is being recharged with liquid the liquid from box 32 is being drained through outlet $37^a$, and the flow of liquid is preferably so timed from pipe 37 and box 32 that at approximately the time the receptacle 1 is recharged with liquid and its complement of air box 32 will be emptied, and the pressure on diaphragm 42 will be relieved, and valve 10 will again open, and the operation will be repeated. It will be thus observed that the outflowing air from between the liquid and steam in receptacle 1 is the actuating medium for shutting off the steam at the valve 10 through the interposed time-box 32, cramper 34, and valve-controlling diaphragm 42, because when such air forces all the liquid from pipe 30 the pressure on diaphragm 36 is relieved and the liquid from box 32 is permitted to act on diaphragm 42 to close the steam-valve.

The operation of my invention as embodied in the apparatus illustrated may be summarized, briefly, as follows: Filling the receptacle with liquid and its complement of air, admitting steam to the receptacle until the liquid is forced down to about a fixed level, utilizing liquid that flows through pipe 30 to charge the time-box 32 and causing liquid from such pipe during the discharge from the receptacle to shut off the flow of liquid from the time-box, suddenly discharging the air from the surface of the liquid remaining in the receptacle to permit the steam to engage the liquid to start condensation and utilizing such discharged air for withdrawing the pressure from diaphragm 36 to permit liquid to pass from the time-box through pipes 33, 37, and 46 to chamber 45, utilizing the pressure of such liquid to operate the valve 10 to shut off the steam from the receptacle, permitting the liquid to drain from the time-box and the pipes beneath the same to withdraw the pressure from chamber 45, and simultaneously completing condensation of the steam in the receptacle to form a partial vacuum therein, and thereby recharge the receptacle with liquid, whereby when the same is recharged to the desired extent (the liquid having drained from chamber 45) the steam-valve 10 will again open, and repeating the operations. By regulating the outflow of liquid from pipe 37 by means of cock 37ª the steam may be admitted to the receptacle sooner or later to accord with the desired height of the liquid therein, and by employing the air discharged through pipe 18 from between the liquid and the steam for permitting the flow of liquid from the time-box 32 the steam is maintained under pressure in the receptacle until such air is discharged and condensation has started by reason of the descent of the steam upon the liquid remaining in the receptacle. By having the air-discharge outlet 18 above the liquid-discharge outlet some liquid will remain in the receptacle at all times to serve in permitting the condensation of steam to quickly start.

It is obvious that in place of a flexible diaphragm between chambers 35 and 40 to control the passage of liquid through pipe 37 and a flexible diaphragm to operate valve 10 movable pistons could be substituted to accomplish the same results.

While I have shown the air-inlet 19 24 and the pipe 30 connected with pipe 18, whereby air may pass in both directions through the perforations in said pipe within receptacle 1 to keep the perforations clean, it is obvious that air may be admitted to the receptacle through an inlet independent of the pipe through which liquid and air are discharged for controlling the steam-valve 10.

Modifications may be made in the arrangements shown and described without departing from the spirit of my invention.

Having now described my invention, what I claim is—

1. An apparatus of the character described, comprising a receptacle provided with liquid induction and eduction means, a valve for admitting steam thereto and shutting it off therefrom, means for admitting air to the surface of the liquid in said receptacle to provide an insulating stratum between the liquid and steam, a pipe connected with the lower interior of the receptacle to permit the passage of liquid and air from the surface of the liquid in the receptacle, a box with which said pipe communicates, means connected with said steam-valve and said box to be operated by the flow of liquid from the box to operate the valve, and means connected with said pipe for controlling the flow of liquid from said box through the medium of liquid and air passing through said pipe, substantially as described.

2. An apparatus of the character described, comprising a receptacle provided with liquid induction and eduction means, a valve for admitting steam thereto and shutting it off therefrom, means for admitting air to the surface of the liquid in said receptacle to provide an insulating stratum between the liquid and steam, a pipe connected with the lower interior of the receptacle to permit the passage of liquid and air from the surface of the liquid in the receptacle, a box with which said pipe communicates, means connected with said steam-valve and said box to be operated by the flow of liquid from the box to operate the valve, means interposed in the path of liquid passing from said box for controlling such flow of liquid, and a pipe connecting said means with the first-named pipe for causing the liquid and air passing through the last-named pipe to operate said means, substantially as described.

3. An apparatus of the character described, comprising a receptacle provided with liquid induction and eduction means, a valve for admitting steam thereto and shutting it off therefrom, means for admitting air to the surface of the liquid in said receptacle to provide an insulating stratum between the liquid and steam, a pipe connected with the lower interior of the receptacle to permit the passage of liquid and air from the surface of the liquid in the receptacle, a box with which said pipe communicates, means connected with said valve and said box to be operated by the flow of liquid from the box to operate the valve, a chamber communicating with said box and with the means for controlling said valve and provided with a movable member to control the flow of liquid through said chamber, and a pipe connecting a chamber on the opposite side of said movable member with the first-named pipe, whereby the flow of liquid and air through said pipe will control the flow of liquid from the box to regulate the movements of the steam-valve, substantially as described.

4. An apparatus of the character described, comprising a receptacle provided with liquid induction and eduction means, a valve for admitting steam thereto and shutting it off therefrom, means for admitting air to the surface of the liquid in said receptacle to provide an insulating stratum between the liquid and steam, a pipe connected with the lower interior of the receptacle to permit the passage of liquid and air from the surface of the liquid in the receptacle, a box with which said pipe communicates, means connected with said steam-valve to operate the same, a casing having a flexible diaphragm providing chambers on opposite sides thereof, a pipe connecting one chamber with the first-named pipe, a pipe connecting said box with the other of said chambers, a pipe connecting said chamber with the means for controlling the valve, and means for permitting the diaphragm to control the flow of liquid from said box through said chamber, substantially as described.

5. An apparatus of the character described, comprising a receptacle provided with liquid induction and eduction means, a valve for admitting steam thereto and shutting it off therefrom, means for admitting air to the surface of the liquid in said receptacle to provide an insulating stratum between the liquid and steam, a pipe connected with the lower interior of the receptacle to permit the passage of liquid and air from the surface of the liquid in the receptacle, a box with which said pipe communicates, means connected with said box for controlling the flow of liquid therefrom, a pipe connecting said means with the first-named pipe, a casing having a movable member to operate the steam-valve, and a pipe connected with the means for controlling the flow of liquid from the box and communicating with said movable member for operating the steam-valve, substantially as described.

6. An apparatus of the character described, comprising a receptacle provided with liquid induction and eduction means, a valve for admitting steam thereto and shutting it off therefrom, means for admitting air to the surface of the liquid in said receptacle to provide an insulating stratum between the liquid and steam, a pipe connected with the lower interior of the receptacle to permit the passage of liquid and air from the surface of the liquid in the receptacle, a box with which said pipe communicates, means connected with said pipe to control the flow of liquid from said box, means connected with said valve and said box to be operated by the flow of liquid from the box to operate the valve, and means for restricting the flow of liquid from the box to regulate the time of closing the steam-valve, substantially as described.

7. An apparatus of the character described, comprising a receptacle provided with liquid induction and eduction means, a valve for admitting steam thereto and shutting it off therefrom, means for admitting air to the surface of the liquid in said receptacle to provide an insulating stratum between the liquid and steam, a pipe connected with the lower interior of the receptacle to permit the passage of liquid and air from the surface of the liquid in the receptacle, a box with which said pipe communicates, means connected with said pipe to control the flow of liquid from said box, means connected with said valve and said box to be operated by the flow of liquid from the box to operate the valve, and a casing provided with a flexible diaphragm adapted to operate the steam-valve, said casing having a chamber on one side of said diaphragm and a pipe communicating with said chamber and with the means for controlling the flow of liquid from said box, substantially as described.

8. An apparatus of the character described, comprising a receptacle provided with liquid induction and eduction means, a valve for admitting steam thereto and shutting it off therefrom, means for admitting air to the surface of the liquid in said receptacle to provide an insulating stratum between the liquid and steam, a pipe connected with the lower interior of the receptacle to permit the passage of liquid and air from the surface of the liquid in the receptacle, a box with which said pipe communicates, a casing having a pair of chambers separated by a movable member, one chamber being connected by a pipe with the first-mentioned pipe, the other chamber being connected with said box, means connected with said chamber and said valve to be operated by the flow of liquid from the box to operate the valve, and means for restricting the flow of liquid from said chamber, substantially as described.

9. An apparatus of the character described, comprising a receptacle provided with liquid induction and eduction means, a valve for admitting steam thereto and for shutting it off therefrom, means to admit air to the receptacle, a pipe leading from the lower interior of said receptacle, a box communicating with said pipe and located above the receptacle, a casing provided with a movable member having chambers on opposite sides thereof, one of said chambers being connected with said box and the other chamber connected with said pipe, a pipe leading from said first-named chamber, said member being adapted to control the flow of liquid to and from said chamber, a casing provided with a movable member and a chamber, said member being adapted to operate the steam-valve, and a pipe connecting said chamber with one of the chambers of said first-named casing, substantially as described.

10. An apparatus of the character described, comprising a receptacle provided with liquid induction and eduction means, a valve for admitting steam thereto and for shutting it off therefrom, means to admit air to the receptacle, a pipe leading from the lower interior of said receptacle, a box communicating with said pipe and located above the receptacle, a casing provided with a movable member having chambers on opposite sides thereof, one of said chambers being connected with said box and the other chamber connected with said pipe, a pipe leading from said first-named chamber, said member being adapted to control the flow of liquid to and from said chamber, a casing provided with a movable member and a chamber, said member being adapted to operate the steam-valve, a pipe connecting said chamber with one of the chambers of said first-named casing, and means for restricting the flow of liquid from said pipe, substantially as described.

11. An apparatus of the character described, comprising a receptacle provided with liquid induction and eduction means, a valve for admitting steam thereto and shutting it off therefrom, means for admitting air to the surface of the liquid in said receptacle, a pipe connected with the lower interior of the receptacle to permit the passage of liquid and air from the surface of the liquid in the receptacle, a time-box with which said pipe communicates, means for causing the periodical discharge of liquid from said box, a discharge-pipe leading from said box, and means with which said pipe communicates for operating the steam-valve, substantially as described.

12. An apparatus of the character described, comprising a receptacle provided with liquid induction and eduction means, a valve for admitting steam thereto and shutting it off therefrom, means for operating said steam-valve by liquid forced from the receptacle, means for admitting air to the surface of the liquid in said receptacle, a time-box placed above the means for operating the steam-valve, means to cause liquid and air to pass from the receptacle into the time-box, means for periodically discharging the liquid from the time-box, and means for causing the liquid discharged from the time-box to shut steam off from the receptacle, substantially as described.

13. In a steam and vacuum pump the combination of a receptacle provided with liquid induction and eduction means, a valve for admitting steam to and shutting it off from the receptacle, means for operating the steam-valve by liquid forced from the receptacle, means for admitting a limited quantity of air to the receptacle, a time-box, means for periodically forcing liquid and air from the receptacle into the time-box, means for causing the periodical discharge of liquid from the time-box to operate the steam-valve, comprising a cramper consisting of a casing having two separate closed chambers on opposite sides of a flexible diaphragm, one of said chambers being connected with the passage for liquid from the receptacle to the time-box, a connection between the other chamber and the time-box and a connection between the last-named chamber and the means that operate the steam-valve, substantially as described.

14. A steam and vacuum pump of the character described, comprising a receptacle provided with liquid induction and eduction means, a valve for controlling the flow of steam to the receptacle, means for operating the same by liquid which is forced from the receptacle, an air-inlet for supplying a limited quantity of air into the receptacle, means for discharging a limited quantity of liquid and the air from the receptacle when the liquid in the receptacle is forced down to a predetermined level, a time-box into which said limited quantity of liquid and the air is discharged, a pipe or passage leading from the time-box to the means for operating the steam-valve, and means for controlling the flow of liquid from the time-box and operating the steam-valve to accord with the extreme rise and fall of liquid in the receptacle, substantially as described.

15. The combination of a receptacle provided with liquid induction and eduction means, a valve for admitting steam thereto, a time-box in communication with the lower interior of the receptacle, means for operating the steam-valve connected with said time-box, means for causing liquid conducted from the lower interior of the receptacle to the time-box to be periodically discharged from the same, means for operating the steam-valve by the periodical flow of liquid from the time-box, a condensing-pipe leading from the eduction pipe or passage to the receptacle, and means for admitting a limited volume of air to the receptacle, substantially as described.

16. The combination of a receptacle provided with liquid induction and eduction means, a pipe and valve for admitting steam thereto, a condensing pipe or passage leading from the discharge-passage to the receptacle, means for admitting a limited volume of air to the receptacle and preventing the discharge of air or steam therefrom, a time-box in communication with the lower interior of the receptacle, means for causing the periodical flow of liquid from the time-box, and means for operating the steam-valve by said periodical flow of liquid, substantially as described.

17. The combination of a receptacle provided with liquid induction and eduction means, a valve for admitting steam thereto, a chamber having a movable member to operate said valve, a box located above the receptacle and communicating with said chamber, a pipe connecting said box with the lower interior of said receptacle, and means connected with said pipe and the passage from the time-box to the valve-operating member arranged to stop the flow of liquid from said box to the latter by reason of the difference in pressure of liquid from said pipe and said time-box, substantially as described.

18. The combination of a receptacle provided with liquid induction and eduction means, a valve for admitting steam thereto, means for operating the steam-valve, a time-box located above the receptacle, a pipe connecting the lower interior of the receptacle with the time-box, a casing having a flexible diaphragm providing a chamber on opposite sides, one chamber being connected with said pipe, the other chamber being connected with said time-box and with the means for operating the steam-valve, the operative area of the diaphragm in the chamber connected with said pipe being greater when the pipe is filled with liquid than the operative area of the diaphragm in the other chamber, substantially as described.

19. The combination of a receptacle provided with liquid induction and eduction means, a valve for admitting steam thereto, means for operating the steam-valve, a time-box located above the receptacle, a pipe connecting the lower interior of the receptacle with the time-box, a casing having a flexible diaphragm providing a chamber on opposite sides, one chamber being connected with said pipe, the other chamber being connected by a pipe with said box, the latter chamber having an outlet adapted to be covered by said diaphragm whereby the operative area of said diaphragm on opposite sides is caused to differ when the diaphragm is bulged toward said outlet, a pipe connecting said outlet with the valve-operating means, and means to cause the discharge of the liquid from said pipe to cause the opening of the steam-valve, substantially as described.

20. The combination of a receptacle provided with liquid induction and eduction means, a valve for admitting steam thereto, a box located above the receptacle, a pipe connecting said box and receptacle, a pipe leading from the box, means to cause the periodical discharge of liquid from said box, means connected with said box and valve for operating the latter, and means for controlling the rate of discharge of liquid from the time-box to accord with the recharging of the receptacle with liquid, substantially as described.

ADDISON G. WATERHOUSE.

Witnesses:
T. F. BOURNE,
M. HOLLINGSHEAD.